(12) United States Patent
Abrams et al.

(10) Patent No.: US 7,805,429 B2
(45) Date of Patent: Sep. 28, 2010

(54) PERSONALIZED AD DELIVERY WHEN ADS FATIGUE

(75) Inventors: Zoe Abrams, Kensington, CA (US); Erik Nathan Vee, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 409 days.

(21) Appl. No.: 12/021,588

(22) Filed: Jan. 29, 2008

(65) Prior Publication Data

US 2009/0192984 A1 Jul. 30, 2009

(51) Int. Cl.
*G06F 17/30* (2006.01)
(52) U.S. Cl. .................................. 707/706; 707/707
(58) Field of Classification Search ................ 707/706, 707/707, 999.003
See application file for complete search history.

(56) References Cited

U.S. PATENT DOCUMENTS

| | | | |
|---|---|---|---|
| 7,363,302 B2 * | 4/2008 | Lester | 1/1 |
| 7,523,087 B1 * | 4/2009 | Agarwal et al. | 1/1 |
| 2004/0243623 A1 * | 12/2004 | Ozer et al. | 707/102 |
| 2008/0052152 A1 * | 2/2008 | Yufik | 705/14 |
| 2008/0072132 A1 * | 3/2008 | Moraveji et al. | 715/203 |
| 2008/0091535 A1 * | 4/2008 | Heiser et al. | 705/14 |
| 2008/0215416 A1 * | 9/2008 | Ismalon | 705/10 |

* cited by examiner

*Primary Examiner*—John R. Cottingham
*Assistant Examiner*—Noosha Arjomandi
(74) *Attorney, Agent, or Firm*—Brinks Hofer Gilson & Lione; Nathan O. Greene; John G. Rauch (57) ABSTRACT

A method is disclosed for diminishing user advertisement fatigue to increase click efficiency, including receiving a search query or browsing action from a user; analyzing a plurality of advertisements available for delivery to a search results page in response to the search query or browsing action; arranging the plurality of advertisements in a queue so that, when delivered sequentially from the queue, no advertisement is viewable more than once on a search results page, to thereby reduce advertisement fatigue of the user; and delivering the queued plurality of advertisements sequentially to the search results pages of the user.

24 Claims, 5 Drawing Sheets

FIG. 1

|  | t = 1 | t = 2 |
|---|---|---|
| Position 1 | A / 1 | A / ½ |
| Position 2 | B / ½ | B / ¼ |

FIG. 2

|  | t = 1 | t = 2 |
|---|---|---|
| Position 1 | A / 1 | B / 1 |
| Position 2 | C / ¼ | A / ¼ |

FIG. 3

| | P1 | | | | P2 | | | | P3 | | | | |
|---|---|---|---|---|---|---|---|---|---|---|---|---|---|
| T | A | B | B | C | D | A | A | B | C | E | A | B | C | E | D |

FIG. 4

| | T1 | T2 | T3 | T4 | T5 |
|---|---|---|---|---|---|
| P1 | A | B | B | C | D |
| P2 | A | A | B | C | E |
| P3 | A | B | C | E | D |

FIG. 5

| | T1 | T2 | T3 | T4 | T5 |
|---|---|---|---|---|---|
| P1 | A | B | B | C | D |
| P2 | E | A | A | B | C |
| P3 | G | E | F | A | B |

PERSONALIZED AD DELIVERY WHEN ADS FATIGUE

BACKGROUND

1. Technical Field

The disclosed embodiments relate generally to the field of online searching and ad delivery, and more particularly, to a system and methods for considering individual user experience when delivering advertisements to prevent or reduce ad fatigue while serving advertisements.

2. Related Art

Internet advertising is a booming business, and already provides a large portion of search engine revenue. Placing ads strategically is key to optimizing the efficiency of these advertising systems. The current measures used in most academic literature to determine the match between advertisement and user is the estimated click through rate (CTR) based on the advertisement, the keyword, and the position on the web page. In practice, landing page information and demographic targeting have been used to better match advertisements to users.

SUMMARY

By way of introduction, the embodiments described below are drawn to systems and methods for considering individual user experience when delivering advertisements to prevent or reduce ad fatigue while serving advertisements.

In a first aspect, a method is disclosed for diminishing user advertisement fatigue to increase click efficiency, including receiving a search query or browsing action from a user; analyzing a plurality of advertisements available for delivery to a search results page in response to the search query or browsing action; arranging the plurality of advertisements in a queue so that, when delivered sequentially from the queue, no advertisement is viewable more than once on a search results page, to thereby reduce advertisement fatigue of the user; and delivering the queued plurality of advertisements sequentially to the search results pages of the user.

In a second aspect, a method is disclosed for increasing clicks-per-advertisement displayed on a web page, including flattening a multi-dimensional table of at least rows and columns, wherein the rows represent an ad position (P) and the columns represent a time period (T), wherein flattening includes creating a single-dimensional vector of a plurality of advertisements (I) from the multi-dimensional table arrayed in a plurality of position/time (p, t) slots such that an advertisement i having a largest flattened value $(v_i)$ is placed in slot (p, t) and the remainder of the plurality of advertisements are sequentially placed in the flattened table according to respective flattened values; reconstructing the multi-dimensional table by arranging the advertisements sequentially along the rows; and shifting the advertisements of at least one row into subsequent time periods (T) such as to substantially guarantee that, for each advertisement i, all occurrences of advertisement i in position p are displayed to a user before any occurrences of advertisement i in position p+1, wherein each advertisement i viewed the most times or for the longest period of time is allocated to a lower position p to reduce advertisement fatigue of the user.

In a second aspect, a method is disclosed for increasing clicks-per-advertisement displayed on a web page, including flattening a multi-dimensional table of at least rows and columns, wherein the rows represent one of an ad position (P) and a time period (T), and the columns represent the other of the ad position (P) and the time period (T), wherein flattening includes creating a single-dimensional vector of a plurality of advertisements (I) from the multi-dimensional table arrayed in a plurality of position/time (p, t) slots such that a flattened value $(v_i)$ of each of the plurality of advertisements i is considered in their placement in the plurality of slots; reconstructing the multi-dimensional table by arranging the advertisements sequentially along the rows or columns associated with the ad position (P); and shifting the advertisements of at least one of the rows or columns associated with the ad position (P) into subsequent time periods such as to substantially guarantee that, for each advertisement i, all occurrences of advertisement i in position p are displayed to a user before any occurrences of advertisement i in position p+1, wherein each advertisement i viewed the most times or for the longest period of time is allocated to a lower position p to reduce advertisement fatigue of the user.

In a fourth aspect, a system is disclosed for diminishing user advertisement fatigue to increase click efficiency, including a memory to store instructions, a processor to execute the instructions, a traffic history database to store traffic data related to Web user browsing and searching, and an advertiser database for storing an advertisement inventory including a plurality of advertisements available for delivery to search results pages of a plurality of Web users. The processor receives a search query or browsing action from a Web user; analyzes the plurality of advertisements in response to the search query or browsing action; arranges the plurality of advertisements in a queue so that, when delivered sequentially from the queue, no advertisement is viewable more than once on a search results page, to thereby reduce advertisement fatigue of the user; and delivers the queued plurality of advertisements sequentially to the search results pages of the user.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION

In the following description, numerous specific details of programming, software modules, user selections, network transactions, database queries, database structures, etc., are provided for a thorough understanding of various embodiments of the systems and methods disclosed herein. However, the disclosed system and methods can be practiced with other methods, components, materials, etc., or can be practiced without one or more of the specific details. In some cases, well-known structures, materials, or operations are not shown or described in detail. Furthermore, the described features, structures, or characteristics may be combined in any suitable manner in one or more embodiments. The components of the embodiments as generally described and illustrated in the Figures herein could be arranged and designed in a wide variety of different configurations.

The order of the steps or actions of the methods described in connection with the disclosed embodiments may be changed as would be apparent to those skilled in the art. Thus, any order appearing in the Figures, such as in flow charts, or in the Detailed Description is for illustrative purposes only and is not meant to imply a required order.

Several aspects of the embodiments described are illustrated as software modules or components. As used herein, a software module or component may include any type of computer instruction or computer executable code located within a memory device and/or transmitted as electronic signals over a system bus or wired or wireless network. A software module may, for instance, include one or more physical or logical blocks of computer instructions, which may be organized as a routine, program, object, component, data structure, etc. that performs one or more tasks or implements particular abstract data types.

In certain embodiments, a particular software module may include disparate instructions stored in different locations of a memory device, which together implement the described functionality of the module. Indeed, a module may include a single instruction or many instructions, and it may be distributed over several different code segments, among different programs, and across several memory devices. In some embodiments, modules may be combined within an integrated set of instructions. Some embodiments may be practiced in a distributed computing environment where tasks are performed by a remote processing device linked through a communications network. In a distributed computing environment, software modules may be located in local and/or remote memory storage devices.

Figure 1:
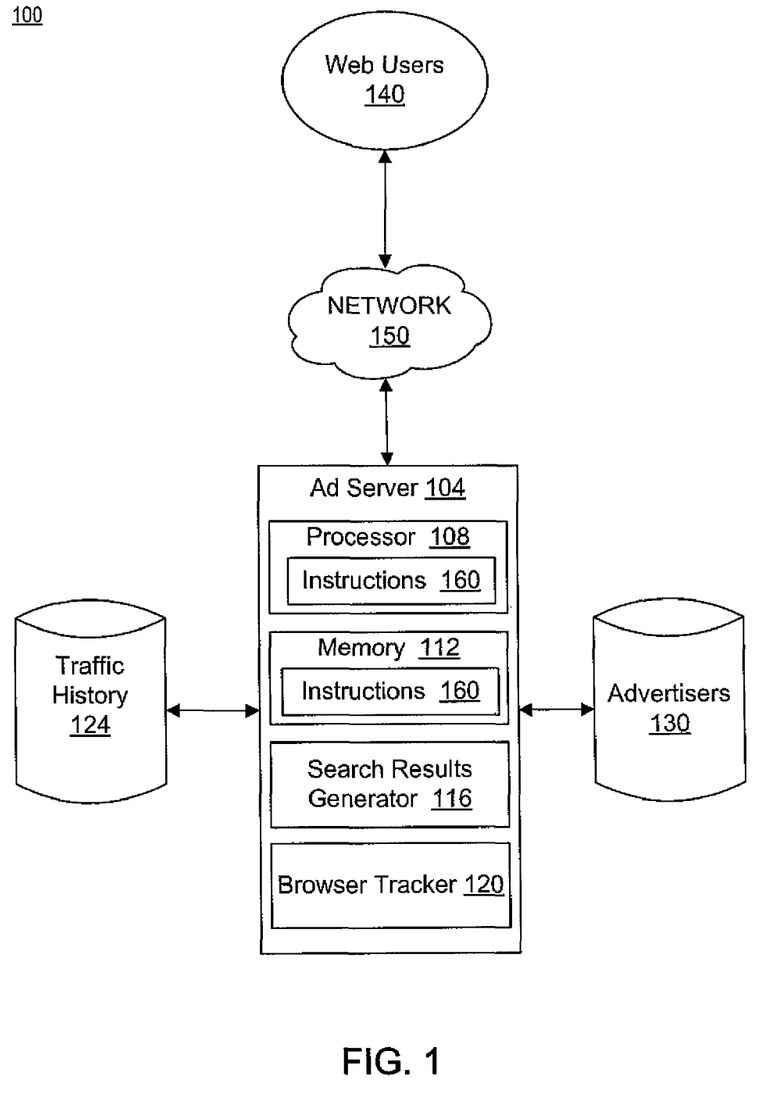
FIG. 1 is a diagram of an exemplary system for personalizing ad delivery layout in the consideration of ad fatigue.

FIG. 1 is a diagram of an exemplary system 100 for personalizing ad delivery layout in the consideration of ad fatigue. The system 100 includes an advertising ("ad") server 104, which includes a processor 108, a memory 112 or other storage, a search results generator 116, a browser tracker 120, a traffic history database 124, and an advertiser's database 130. The system 100 also includes a plurality of Web users 140 communicating with the ad server 104 over a network 150. As discussed, the databases 124 and 140 may be physically integrated with the ad server 104 as one or more databases or may be located in various possible distributed locations to extend data storage access to distributed computing.

The network 150 may include a wide area network (WAN), such as the internet, a local area network (LAN), campus area networks, metropolitan area networks, and wireless or wired networks, or any other networks that may allow for web access communication.

The ad server 104 may include a set of instructions 160 that may be executed to cause the ad server 104 to perform any one or more of the methods or computer based functions disclosed herein. A plurality of user identifications ("user IDs") may pass from the Web users 140 through the ad server 104 and to the traffic history database 124. Various types of Web traffic data may be stored in the traffic history database 124 in association with the plurality of user IDs, including but not limited to: Web user histories, ad fatigue rates, time horizon predictions, e.g., an amount of time or the number of times an advertisement is predicted to be displayed to a given user. A plurality of candidate advertisements, or an advertisement inventory, may be stored in the advertiser's database 150 for service to the Web users 140. Additionally, an advertisement identification sequence may be attached to each advertisement in the advertiser's database 150 to allow for tracking and sorting sets of ads as discussed below.

When a Web user 140 queries the ad server 104, which may also occur through a browsing action, the ad server 104 may execute the instructions 160 according to the search results generator 116 to serve at least one advertisement to the Web user 140. The search results generator 116 will produce and list the search results in bid order or an order somehow affected by relevancy. The queries may also cause the browse tracker 120 to track traffic-related data and to pass that data back to the ad server 104 for storage in the traffic history database 124. This data, such as that discussed above, may be used by the ad server 104 to execute the methods and algorithms disclosed herein to personalize advertisement delivery to the Web user 140 such as to prevent or substantially reduce advertisement fatigue. To prevent or substantially reduce advertisement fatigue is variably referred to herein as increasing efficiency of user click-through rates.

Herein is explored consideration of the individual user in determining when and where to place ads. There are many ways that an individual user's experience may influence how an advertisement is received, including previous positive or negative experiences with advertisements and previous exposure to a company name or logo. Also considered herein is how previous experiences viewing an advertisement influence a user's likelihood to click on that advertisement. The setting used is one where advertisements are embedded in web pages, such as AdSense, available online at google.com, offered by Google Inc., Mountain View, Calif., or Content Match available online at yahoo.com and offered by Yahoo! Inc. of Sunnyvale, Calif. An individual user may view the particular site several times in a single day, if the site is a user's homepage or a frequently visited resource, and advertisements are less likely to be clicked as they are viewed more often. This phenomenon is referred to as ad fatigue, since the user tires of the advertisement or is less receptive to its message after viewing it several times. The issue is one of determining which advertisements to display and where and when to display them. The order of displaying advertisements to maximize efficiency given that ads are fatiguing includes the expected number of clicks times the value of that click to the advertiser ($v_i$) for each advertisement. An algorithm has been designed that achieves close to optimum efficiency, which is discussed below, which may be executed by the system 100.

The following are considered available as input to the algorithm. (1) The maximum number of times, T, a particular web page will be viewed by a single user during the course of some time period. (2) A vector f of fatigue rates that contains T values, all of which are greater than or equal to zero (0) and less than or equal to one (1). We use $f_t$ to denote the value corresponding to the $t^{th}$ element of the vector f. (3) A click-through rate vector CTR representing the decay in expected clicks due to position on the page, sorted from highest position to lowest position, wherein the lowest position represents the least likely to be clicked. We use $CTR_p$ to denote the value corresponding to position p. There are p∈$\{1, \ldots, P\}$ positions total. (4) A set of advertisements, each with a value $v_i$, i∈$\{1, \ldots, P\}$. For an advertisement i, $v_i$ represents the value to the advertiser showing the advertisement for receiving a click, times the advertisement dependent component of the click through rate (CTR). Although in practice, values are private and known only to the advertiser, there are options for estimating this value based on information observable to a search engine that interacts with searching users.

Herein, the term "slot" signifies an opening for an advertisement at a particular time and in a particular position on a web page. A slot may refer to a location to deliver a sponsored advertisement or to deliver an advertisement returned as an organic search result from user searching or browsing actions. There are usually a limited number of slots per page for the different types of advertisements (whether organic or sponsored). For example, in one embodiment, there are usually 14 to 15 slots per page for delivery of sponsored advertisements delivered in response to a keyword query.

The results, algorithm, and model make the following assumptions. (1) Advertisement values are all a power of some base b. This assumption can be relaxed by rounding advertisement values down to the nearest number with base b and multiplying the result in Theorem 1 (discussed below) by a factor of 1/b. (2) Values in f (fatigue vector) are decreasing, and all of the form $f_i = 1/b^r$, (3) The expected number of times an advertisement will be clicked when shown for the $k^{th}$ time in position p is $CTR_p \cdot f_k$. (4) A slot can be left empty. In other words, we are not required to put an advertisement in every slot.

For every time slot t, position p, and advertisement (or bidder) i, let $x_{ipt}$ be an indicator variable for whether advertisement i is shown in that time position (ip) slot. Note that time t can also be thought of as a query. We require a solution such that $$\forall it, \sum_p x_{ipt} \leq 1. \quad (1)$$

This result can be articulated as an advertisement can only be shown in one position for a given time slot. Let $\forall it$, $y_{it} = \sum_{k<t,p} x_{ipt}$. In other words, $y_{it}$ is the number of times in the solution so far that advertisement i has already been shown at time t. The problem is to decide which advertisement to show in which position and at which time such that we maximize the total efficiency, given by $$\sum_{ipt} x_{ipt} \cdot CTR_p \cdot f_{y_{it}} \cdot v_i \quad (2)$$

EXAMPLE

Figure 2:
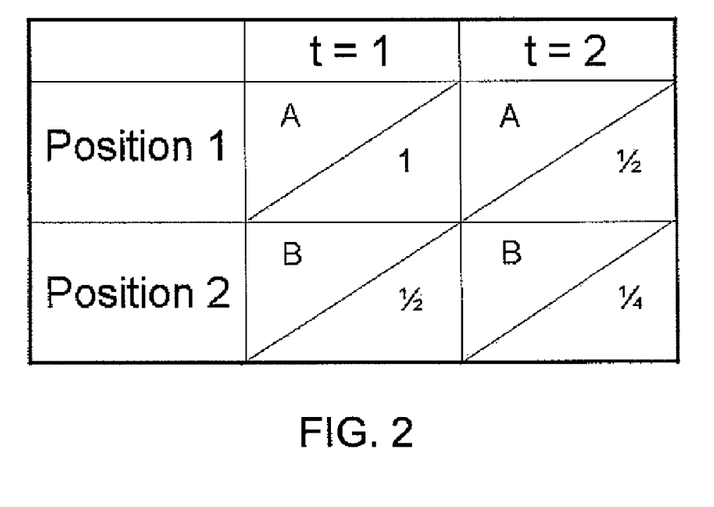
FIG. 2 is a greedy solution in a motivating example to consider ad fatigue when delivering advertisements.
Figure 3:
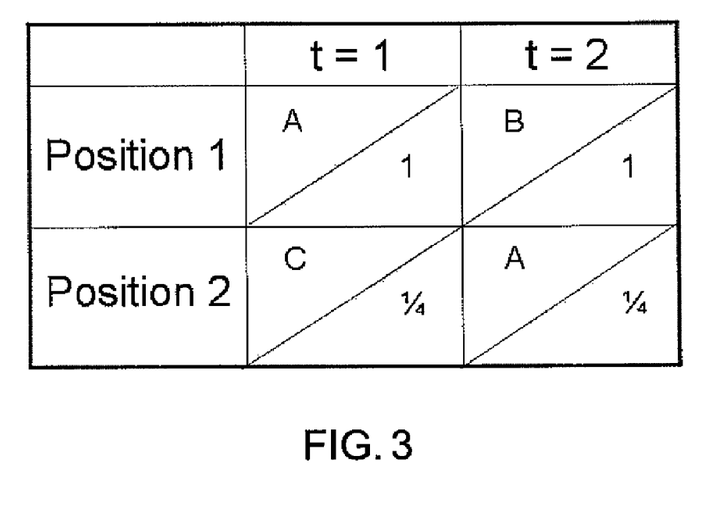
FIG. 3 is an optimal solution in a motivating example to consider ad fatigue when delivering advertisements.

FIG. 2 is a greedy solution in a motivating example to consider ad fatigue when delivering advertisements. FIG. 3 is an optimal solution in a motivating example to consider ad fatigue when delivering advertisements. In each FIG. 2 and FIG. 3, the columns correspond to time periods while the rows correspond to advertisement position such that each cell of the lower right matrix is a (p, t) slot. In each slot, the top, left diagonal represents the specific ad (A, B, or C) and the bottom, right diagonal represents the efficiency they contribute. This example, of course, is a simple one and in reality there would normally be many more advertisements and slots.

Use of the above algorithm developed through equations (1) and (2) indicates the greedy approach (FIG. 2) of placing the best ad in the best display position currently available is not optimal. If we say advertisers A and B have value 1 for placing their ads, than C has value ½, the fatigue vector $$f = \left[1, \frac{1}{2}\right],$$

position clickthrough rates are $$CTR = \left[1, \frac{1}{2}\right],$$

and there are two time periods, so T=2. The greedy placement of advertisements is shown in FIG. 2. The total efficiency is 2.25. However, the optimal solution (FIG. 3) has a total efficiency of 2.5. In the (extreme and impractical) worst case, the greedy approach can lead to as much as T times less than the optimal efficiency.

An Approximation Algorithm

Now is disclosed an algorithm along with an approximation guarantee for its performance. The algorithm works in two stages. In the first stage, we generate a "flattened tableau:" rather than showing a set of P different ads (placed in positions 1, 2, ..., P) during each of the T time steps, imagine that we show just one ad during each of P·T time steps. For the first T time steps, the advertisement is valued as though it were shown in position 1. For the next T time steps, the ad is valued as though it were shown in position 2, and so on. Ad fatigue is applied normally. We can produce an optimal flattened tableau in a greedy fashion; we elaborate in the below discussion with regards to Stage I.

Now, consider "unflattening" the tableau. That is, take the first T ads and place them all in position 1 (in their respective positions). Take the next T ads and place them all in position 2, and so on. This causes two problems: the first is that ads may appear more than once for a given time step, t. The second is that the value that we ascribed to an advertisement in Stage I may no longer be accurate—an advertisement that appears for the first time in, say, the second position in the flattened tableau may appear for the first time in the third position (or beyond) in the unflattened tableau. In Stage II, we provide a method for rearranging (and removing) the ads in such a way that these problems are resolved. Our rearrangement is provably close to the efficiency for the unflattened tableau, which is more efficient than the optimal solution.

Stage I: Finding an Optimal Flattened Tableau

As outlined above, Stage I of the algorithm finds the optimal placement of ads in the flattened tableau. A little more formally, let $\bar{y}_{ipt}$ be the number of times that advertisement i has appeared in slots (p', t') such that either p'<p or p'=p, t'<t. Mathematically, $\bar{y}_{ipt} = \sum_{p'<p} \sum_t x_{ip't} + \sum_{t'<t} x_{ipt'}$. We seek to maximize the following:

$$\sum_{ipt} x_{ipt} \cdot CTR_p \cdot f_{\bar{y}_{ipt}} \cdot v_i. \quad (3)$$

Note that this is the total efficiency, with $y_{ipt}$ replaced with $\bar{y}_{ipt}$. We define $f_{\bar{y}_{ipt}} \cdot v_i$ to be an advertiser's "flattened value". It is not hard to verify that this quantity is maximized using a greedy approach. The pseudocode is given below in Table 1.

TABLE I

STAGE 1 of ALGORITHM A: FLATTENED TABLEAU

Initialize the "flattened value" of each advertisement i to be $v_i$.
For p = 1 to P, and
  For t = 1 to T:
  1. Place the advertisement with the largest "flattened value" in slot (p, t). Ties are broken lexicographically or alphanumerically.
  2. Update the "flattened value" of this advertisement by dividing by b.

Figure 4:
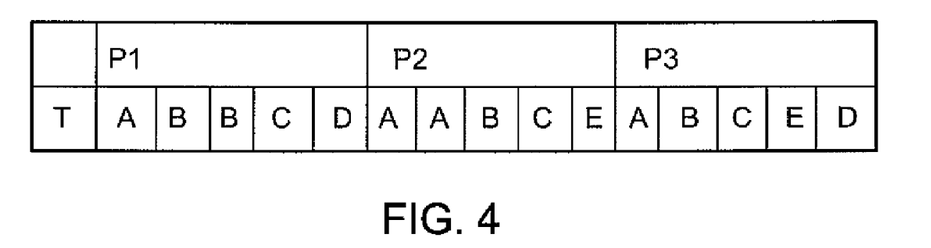
FIG. 4 displays an example of an outcome of Stage I of Algorithm A.

FIG. 4 displays an example of an outcome of Stage I of Algorithm A, wherein all advertisements I are now in a single vector spanned across P, wherein each position is further subdivided as the advertisements are placed therein as per their flattened values $v_i$. Note that each position within P1, P2, and P3 of FIG. 4 corresponds not to an original position, but to a destined position in the unflattened tableau shown in FIG. 5, referred to jointly as $S_p$ below in the first step of Stage II, and shown here for clarity of explanation of Algorithm A. Now shown is that the value obtained in Algorithm A for the flattened tableau (using "flattened values") is better than the value of the optimal solution of the original problem (using the actual values). Let $x_{ipt}^A$ and $x_{ipt}^{OPT}$ be the assignment variables produced by the algorithm of Stage I, and the optimum solution, respectively. We have the following.

Lemma 1: The optimum efficiency is less than:

$$E^{OPT} = \Sigma_{ipt} x_{ipt}^{OPT} \cdot CTR_p \cdot f_{y_{ipt}} \cdot v_i. \quad (4)$$

Proof: The optimum solution differs only from $E^{OPT}$ in the index for the ad fatigue factor. Consider a single advertisement i. All variables multiplying the ad fatigue factor remain unchanged. Since the ad fatigue indices are still 1 through the number of occurrences of the advertisement, these values are the same. The only thing that changes is the pairing of fatigue values to the other variables. But, the way to pair fatigue values with the other multipliers to maximize efficiency is exactly the pairing created in the formula for $E^{OPT}$. For any two vectors of positive real numbers, the maximum dot product is achieved when both are sorted in ascending (or descending) order.

Stage II: Reconstructing from the Flattened Tableau

Figure 5:
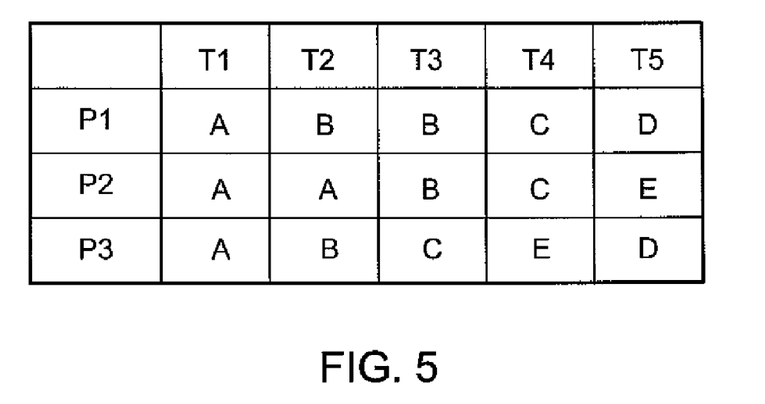
FIG. 5 is a representation of a constructed tableau based on a flattened tableau, as per Stage II of Algorithm A.
Figure 6:
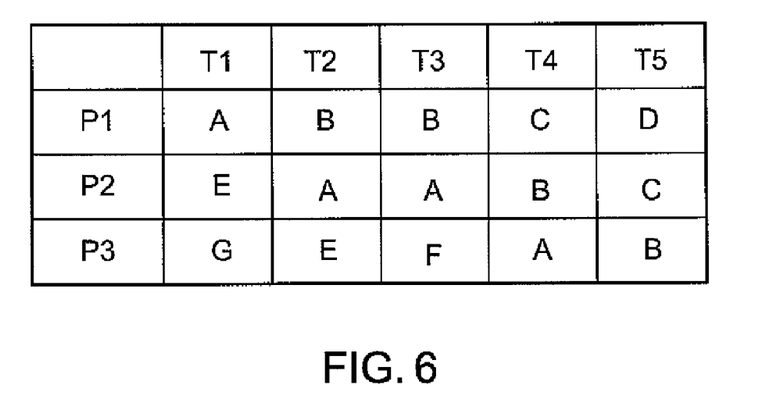
FIG. 6 is a representation of the constructed tableau of FIG. 5 after Stage II shifting.

FIG. 5 is a representation of a constructed final tableau based on a flattened tableau as per step one of Stage II. FIG. 6 is a representation of the constructed tableau of FIG. 5 after Stage II shifting (step two). The tableaus of FIGS. 4 and 5 represent expanded versions of the exemplary tableaus displayed in FIGS. 2 and 3, without explicitly showing efficiency values for each advertisement in I.

The flattened tableau can now be used to construct the final (real) tableau. Stage I produced an assignment of advertisements to slots along vector P. In Stage II, we would like to guarantee that, for all advertisements A, all occurrences of advertisement i in position p appear before any occurrences of advertisement i in position p+1. This is accomplished by arranging the advertisements within each position, then shifting the advertisements to the right until the guarantee is met. This Stage II of Algorithm A is given below in Table II. Shifting advertisements to the right does not affect the total efficiency by more than a small factor. Note also that while the examples of FIGS. 5 and 6 display a tableau for which shifting will be done to the right, other tableaus are contemplated that have a different layout, and as a consequence, a shifting in a different direction, e.g., up, down, left, etc.

TABLE II

STAGE II of ALGORITHM A: FEASIBLE TABLEAU

Given the assignment from Stage I, let $S_p$ be the multi-set of advertisements appearing in position p.
  1. For each p ∈ {1, ..., P}, sort the ads in $S_p$ in ascending order of their v values (breaking ties lexicographically or alphanumerically). Place the first ad in slot (p, 1), the second ad in slot (p, 2), and so on. Note that $S_p$ is a multi-set, so the same advertisement may appear multiple times, always in a contiguous sequence.
  2. For p = 2 to P, shift ads to the right until the last time ad i appears in position p − 1 is before the first time ad i appears in position p, for all I.

Step one of Stage II is displayed in FIG. 5, with the advertisements of all positions P being sorted in ascending order of their v values, filling a first position (row P1) until the next position (row P2) is filled, and so on through position N. In step 2 of Stage II, each position starting with P2 is shifted to the right if required to meet the guarantee discussed above. Note that in FIG. 6, after shifting, each advertisement is shown in the previous time slot before being showed in the present time slot. The shifting makes some holes in various (p, t) slots, but these may be filled in with an inventory of advertisements from the ad server so long as the guarantee is kept and so long as they are delivered from the top of the queue created by Stage I. For instance, advertisement E was filled into slot (p2, t1) and (p2, t2), advertisement G into slot (p3, t1), and advertisement F into slot (p3, t3). In the alternative, empty slots created by the shifting may be left empty.

Likewise, in some embodiments, the matrix of FIG. 6 may be expanded into additional time periods as the rows are shifted to the right according to Algorithm A. In the alternative, if enough page views are displayed to the same user such that all T5 time periods (page views) are exhausted, Algorithm A may be re-executed to mix up the advertisements anew, and then begin serving page views again. In reality, most keyword searches or browsing actions that result in a search results page correlate to a large inventory of advertisements such that page views from a single matrix such as FIG. 6 will rarely be exhausted on a given user. The matrix of FIGS. 5 and 6 are, therefore, exemplary only and of a small size for explanatory purposes.

The approximation ratio for algorithm A may be proven as follows. Let last(j, p) be the last time at which advertisement (or bidder) j is shown in position p and let first(j, p) be the first time advertisements is shown at position p. Let $Q_{jp}$ be the set of unique advertisements shown after advertisements (including j) and in position p. Let $Q_p$ be the set of unique advertisements shown in position p. (Note that $Q_p$ is the set version of the multi-set $S_p$.)

Lemma 2: $\forall p' < p$, $Q_{p'} \subseteq Q_p$. Furthermore, at the end of Algorithm A, every advertiser from $Q_p$ appears in $Q_{p+1}$, in the same order, and beginning immediately after the last ad from $Q_{p+1} - Q_p$.

Proof: For the first part, we only add advertisements to the set S as p increases. For the second portion, every advertisement is shown at most as often as advertisements before it in the queue, and at least as often as after it in the queue. For advertisements shown an equal number of times, the ordering follows the queue's ordering. So, the ordering remains the same between positions, because the queue ordering remains the same. Since any new ads are added to the bottom of queue S, any new advertisement shown at most as many times as an advertisement from the previous positions and will appear earlier after sorting.

Lemma 3: Step 2 of Stage II shifts any row p over by at most $$\frac{T}{|Q_{p-1}|}$$

time periods with respect to the row above it.

Proof: The average number of times an ad is shown in position $$p-1 \text{ is } \frac{T}{Q_{p-1}}.$$

For any j, last(j, p−1) is at most $$T - |Q_{j,p} - 1| \frac{T}{Q_{p-1}}$$

since every advertisement shown afterwards is shown at least as often as the average (sorted in increasing order, by number of times shown). First(j, p) is at least $$T - |Q_{j,p}| \frac{T}{Q_{p-1}} + 1$$

as each advertisement from the position p is shown at most the average number of showings from the previous position (p−1). Clearly, shifting row p over by $$\frac{T}{Q_{p-1}}$$

time units is sufficient to guarantee last(j, p−1)≦first(j, p).

Now, we define Avg to be the average efficiency of an advertisement (or bidder) in position 1, divided by $CTR_I$. Precisely, $$\frac{\sum_{i1t} x_{i1t} \cdot f_{y_{it}} \cdot v_i}{|Q_i|}.$$

Theorem 1: Algorithm A has efficiency of at least $$OPT - Avg \cdot \sum_{p=2}^{p} (p-1) \cdot CTR_p. \qquad (5)$$

Proof: Algorithm A before step 2 of Stage II finds $x_{ipt}$ that maximizes $E^A = \Sigma_{ipt} x_{ipt} \cdot CTR_p \cdot f_{y_{ipt}} \cdot v_i$. By Lemma 1, optimum efficiency≦$E^{OPT}$≦$E^A$. The efficiency of Algorithm A after step 2 is $E^A$ from advertisements that are removed by the process of shifting over the rows. Since $v_i f_{y_{ipt}}$ only decreases as the position increases, by Lemma 3, the efficiency of units shifted off row p is at most $$\sum_{k=1}^{p-1} \frac{T}{|Q_k|} \cdot \frac{CTR_p \sum_{i1t} x_{i1t} \cdot f_{y_{it}} \cdot V_i}{T} \leq (p-1) \cdot CTR_p \cdot Avg. \qquad (6)$$

Summing over all positions, at most $$\sum_{p=2}^{p} (p-1) \cdot CTR_p$$

in efficiency is lost.

Corollary 1: Algorithm A has efficiency at least $$OPT \cdot \left(1 - \frac{p-1}{|Q_1|}\right).$$

Figure 7:
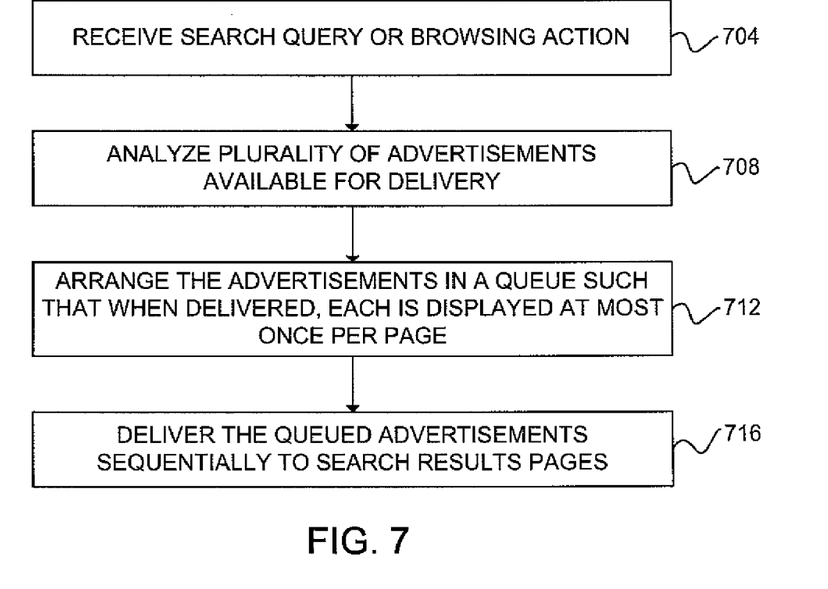
FIG. 7 is a flow chart of a method for diminishing user advertisement fatigue to increase click efficiency.

FIG. 7 is a flow chart of a method for diminishing user advertisement fatigue to increase click efficiency. At block 704, a search query or browsing action is received from a searching or browsing user. At block 708, a plurality of advertisements is analyzed, wherein the advertisements are available for delivery to a search results page in response to the search query or browsing action. At block 712, the plurality of advertisements is arranged in a queue so that, when delivered sequentially from the queue, no advertisement is viewable more than once on a search results page, to reduce advertisement fatigue of the user. At block 716, the plurality of advertisements is delivered sequentially to the search results pages of the user.

Figure 8:
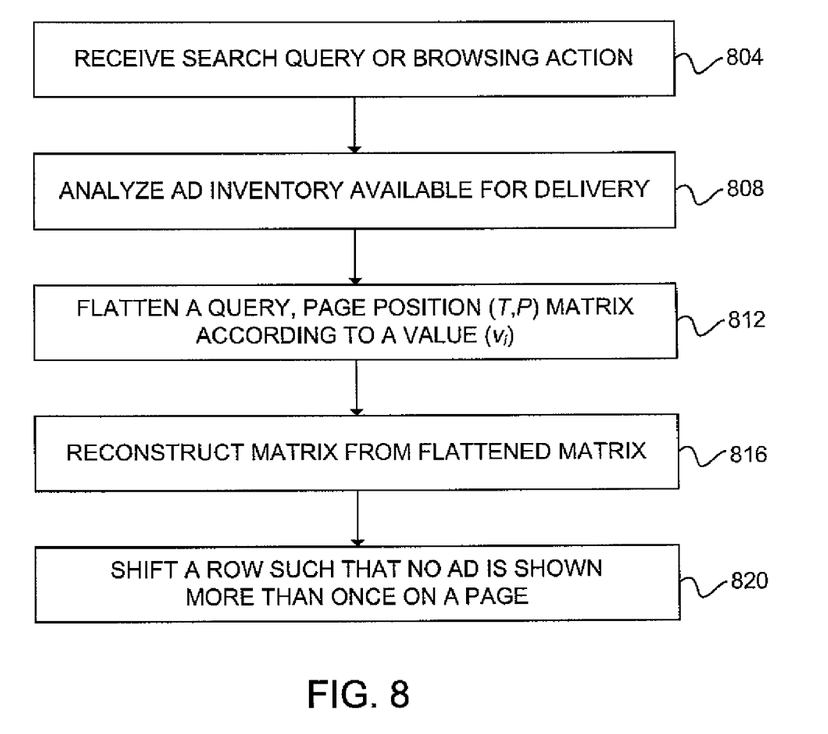
FIG. 8 is a flow chart of another method for diminishing user advertisement fatigue to increase click efficiency.

FIG. 8 is a flow chart of another method for diminishing user advertisement fatigue to increase click efficiency. At block 804, a search query or browsing action is received from a searching or browsing user. At block 808, an advertisement inventory available for delivery in response to the search query or browsing action is analyzed. At block 812, for a matrix of query (T) and page position (P) slots of available advertisements from the advertisement inventory, the matrix (T,P) is flattened into a single vector (P), wherein the advertisements are ordered in ascending order according to a value ($v_i$) of each advertisement i. At block 816, the matrix is reconstructed from the flattened matrix by sequentially filling in a plurality of position (P) rows. At bock 820, at least one row of the matrix starting with the second row is shifted such that no advertisement is shown more than once on a page in response to a query or browsing action, to thereby reduce advertisement fatigue of the user.

Figure 9:
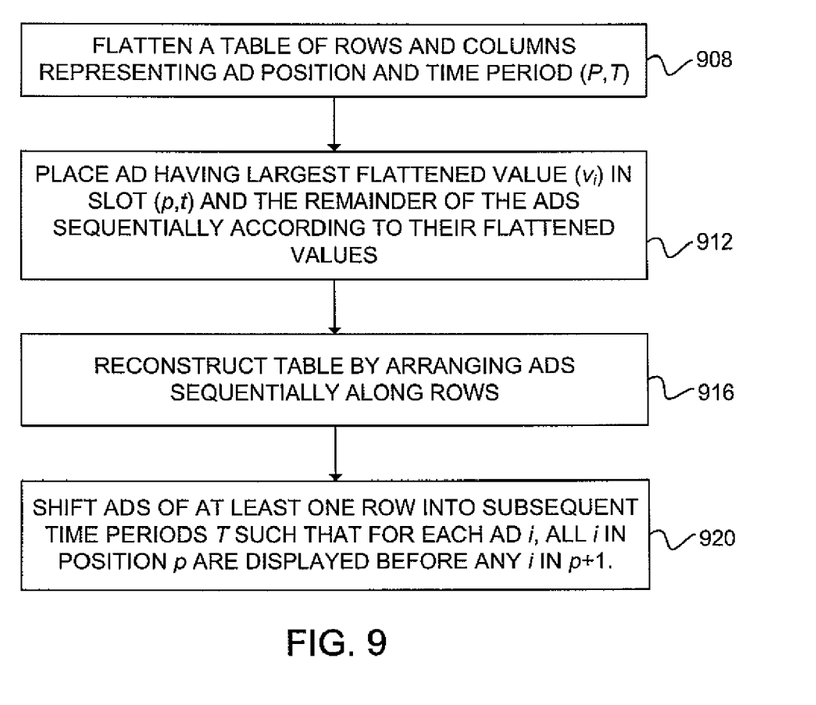
FIG. 9 is a flow chart of a method for increasing clicks-per-advertisement displayed on a web page by reducing advertisement fatigue.

FIG. 9 is a flow chart of a method of increasing click-per-advertisement displayed on a web page by reducing advertisement fatigue. At block 908, a multi-dimensional table of at least rows and columns is flattened, wherein the rows represent an ad position (P) and the columns represent a time period (T). At block 912, flattening includes creating a single-dimensional vector of a plurality of advertisements (I) from the multi-dimensional table arrayed in a plurality of position/time (p, t) slots such that an advertisement i having a largest flattened value ($v_i$) is placed in slot (p, t) and the remainder of the plurality of advertisements are sequentially placed in the flattened table according to respective flattened values. At block 916, the multi-dimensional table is reconstructed by arranging the advertisements sequentially along the rows. At block 920, the advertisements of at least one row is shifted into subsequent time periods (T) such as to substantially guarantee that, for each advertisement i, all occurrences of advertisement i in position p are displayed to a user before any occurrences of advertisement i in position p+1, wherein each advertisement i viewed the most times or for the longest period of time is allocated to a lower position p to reduce advertisement fatigue of the user.

Various modifications, changes, and variations apparent to those of skill in the art may be made in the arrangement, operation, and details of the methods and systems disclosed. The embodiments may include various steps, which may be embodied in machine-executable instructions to be executed by a general-purpose or special-purpose computer (or other electronic device). Alternatively, the steps may be performed by hardware components that contain specific logic for performing the steps, or by any combination of hardware, software, and/or firmware. Embodiments may also be provided as a computer program product including a machine-readable medium having stored thereon instructions that may be used to program a computer (or other electronic device) to perform processes described herein. The machine-readable medium may include, but is not limited to, floppy diskettes, optical disks, CD-ROMs, DVD-ROMs, ROMs, RAMs, EPROMs, EEPROMs, magnetic or optical cards, propagation media or other type of media/machine-readable medium suitable for storing electronic instructions. For example, instructions for performing described processes may be transferred from a remote computer (e.g., a server) to a requesting computer (e.g., a client) by way of data signals embodied in a carrier wave or other propagation medium via a communication link (e.g., network connection).

The invention claimed is:

1. A method of diminishing user advertisement fatigue to increase click efficiency, comprising:
   receiving a search query or browsing action from a user;
   analyzing a plurality of advertisements available for delivery to a search results page in response to the search query or browsing action;
   arranging the plurality of advertisements in a queue so that, when delivered sequentially from the queue, no advertisement is viewable more than once on a search results page, to thereby reduce advertisement fatigue of the user, wherein the queue comprises a matrix of query (T) and page position (P) slots of available advertisements from an advertisement inventory, and wherein arranging includes:
   flattening the matrix into a single vector (P), wherein the advertisements are ordered in ascending order according to a value ($v_i$) of each advertisement i;
   reconstructing the matrix from the flattened matrix by sequentially filling in a plurality of position (P) rows; and
   shifting at least one row of the matrix starting with a second row; and
   delivering the queued plurality of advertisements sequentially to the search results pages of the user.

2. The method of claim 1, wherein the value ($v_i$) of each advertisement i comprises the expected number of clicks and the value of that click to the advertiser.

3. The method of claim 1, wherein shifting at least one row is such that if an advertisement is displayed on the page in a next query or browsing action in time, the advertisement is displayed in a lower position on the page.

4. A method of increasing clicks-per-advertisement displayed on a web page, the method comprising:
   flattening a multi-dimensional table of at least rows and columns, wherein the rows represent an ad position (P) and the columns represent a time period (T), wherein flattening includes creating a single-dimensional vector of a plurality of advertisements (I) from the multi-dimensional table arrayed in a plurality of position/time (p, t) slots such that an advertisement i having a largest flattened value ($v_i$) is placed in slot (p, t) and the remainder of the plurality of advertisements are sequentially placed in the flattened table according to respective flattened values;
   reconstructing the multi-dimensional table by arranging the advertisements sequentially along the rows; and
   shifting the advertisements of at least one row into subsequent time periods (7) such as to substantially guarantee that, for each advertisement i, all occurrences of advertisement i in position p are displayed to a user before any occurrences of advertisement i in position p+1, wherein each advertisement i viewed the most times or for the longest period of time is allocated to a lower position p to reduce advertisement fatigue of the user.

5. The method of claim 4, wherein the rows and columns are switched in position, such that the rows become the columns and represent position (P) and the columns become the rows and represent time periods (T), and wherein shifting the advertisements comprises shifting of at least one column into subsequent time periods (T) across the rows.

6. The method of claim 4, wherein the timer period (T) comprises user queries.

7. The method of claim 4, wherein flattening comprises maximizing $$\sum_{ipt} x_{ipt} \cdot CTR_p \cdot f_{\bar{y}_{ipt}} \cdot v_i$$

where $f_{\bar{y}_{ipt}} v_i$ is the flattened value, $CTR_p$ is the click-through-rate of each respective position, and $x_{ipt}$ is an indicator value based on the (p, t) slot of each advertisement i.

8. The method of claim 7, further comprising:
   updating the flattened value by dividing by a base value (b).

9. The method of claim 7, wherein $\bar{y}_{ipt}$ is a number of times that advertisement i has appeared in slots (p', t') such that either p'<p or p'=p and t'<t, and wherein f is a fatigue rate vector.

10. The method of claim 4, wherein given a multi-set of advertisements ($S_p$) appearing in position p, reconstructing the multi-dimensional table comprises:
    sorting the plurality of advertisements in ascending order of a value ($v_i$) of each advertisement, wherein any ties are broken alphanumerically or lexicographically;
    after sorting, placing the first advertisement in slot (p, 1); and
    placing each subsequent advertisement in slot (p, t+1) through all P.

11. The method of claim 10, further comprising:
    for p=2 to P, shifting advertisements to the right until the last time advertisement appears in position p−1 is before the first time advertisement i appears in position p.

12. The method of claim 10, wherein an advertisement identification sequence is attached to each advertisement.

13. The method of claim 4, wherein placing advertisements in the plurality of slots in the flattened table includes breaking ties between advertisements of the same flattened value alphanumerically or lexicographically.

14. A system for diminishing user advertisement fatigue to increase click efficiency, comprising:
   a memory to store instructions;
   a processor to execute the instructions;
   a traffic history database to store traffic data related to Web user browsing and searching;
   an advertiser database for storing an advertisement inventory including a plurality of advertisements available for delivery to search results pages of a plurality of Web users;
   wherein the processor:
   receives a search query or browsing action from a Web user;
   analyzes the plurality of advertisements in response to the search query or browsing action;
   arranges the plurality of advertisements in a queue so that, when delivered sequentially from the queue, no advertisement is viewable more than once on a search results page, to thereby reduce advertisement fatigue of the user, wherein the queue comprises a matrix of query (T) and page position (P) slots of available advertisements from an advertisement inventory, and wherein arranging includes:
   flattening the matrix into a single vector (P), wherein the advertisements are ordered in ascending order according to a value ($v_i$) of each advertisement i;
   reconstructing the matrix from the flattened matrix by sequentially filling in a plurality of position (P) rows; and
   shifting at least one row of the matrix starting with the a second row; and
   delivering the queued plurality of advertisements sequentially to the search results pages of the user.

15. The system of claim 14, wherein the processor breaks ties in the $v_i$ value alphanumerically or lexicographically.

16. The system of claim 14, wherein the value ($v_i$) of each advertisement i comprises the expected number of clicks and the value of that click to the advertiser.

17. The system of claim 14, wherein the processor shifts at least one row such that if an advertisement is displayed on the page in a next query or browsing action in time, the advertisement is displayed in a lower position on the page.

18. The system of claim 14, wherein the positions (P) are arrayed along the columns of the flattened matrix.

19. The system of claim 14, wherein the processor flattens the matrix by maximizing $$\sum_{ipt} x_{ipt} \cdot CTR_p \cdot f_{\bar{y}_{ipt}} \cdot v_i$$

where $f_{\bar{y}_{ipt}} v_i$ is the flattened value, $CTR_p$ is the click-through-rate of each respective position, and $x_{ipt}$ is an indicator value based on the (p, t) slot of each advertisement i.

20. The system of claim 19, further comprising:
   the processor updates the flattened value by dividing by a base value (b).

21. The system of claim 19, wherein $\bar{y}ipt$ is a number of times that advertisement i has appeared in slots (p', t') such that either p'<p or p'=p and t'<t, and wherein f is a fatigue rate vector.

22. The system of claim 14, wherein given a multi-set of advertisements ($S_p$) appearing in position p, the processor:
   sorts the plurality of advertisements in ascending order of a value ($v_i$) of each advertisement, wherein any ties are broken alphanumerically or lexicographically;
   places the first advertisement in slot (p, 1);
   places each subsequent advertisement in slot (p, t+1) through all P, thereby reconstructing the matrix from the flattened matrix; and
   for p=2 to P, the processor shifts the advertisements to the right until the last time advertisement i appears in position p−1 is before the first time advertisement i appears in position p.

23. A method of increasing clicks-per-advertisement displayed on a web page, the method comprising:
   flattening a multi-dimensional table of at least rows and columns, wherein the rows represent one of an ad position (P) and a time period (T), and the columns represent the other of the ad position (P) and the time period (T), wherein flattening includes creating a single-dimensional vector of a plurality of advertisements (/) from the multi-dimensional table arrayed in a plurality of position/time (p, t) slots such that a flattened value ($v_i$) of each of the plurality of advertisements i is considered in their advertisements placement in the plurality of slots;
   reconstructing the multi-dimensional table by arranging the advertisements sequentially along the rows or columns associated with the ad position (P); and
   shifting the advertisements of at least one of the rows or columns associated with the ad position (P) into subsequent time periods such as to substantially guarantee that, for each advertisement i, all occurrences of advertisement i in position p are displayed to a user before any occurrences of advertisement i in position p+1, wherein each advertisement i viewed the most times or for the longest period of time is allocated to a lower position p to reduce advertisement fatigue of the user.

24. The method of claim 23, wherein the rows correspond to the ad positions (P) and the columns correspond to the time periods (T).

* * * * *